United States Patent
Temming

[11] 3,824,910
[45] July 23, 1974

[54] AIR FLOW CONTROLLING DEVICE FOR MOTOR VEHICLES

[75] Inventor: Josef Temming, Amselweg, Germany

[73] Assignee: Volkswagenwerk Aktiengesellschaft, Wolfsburg, Germany

[22] Filed: May 22, 1973

[21] Appl. No.: 362,652

[30] Foreign Application Priority Data
June 21, 1972  Germany............................ 2230239

[52] U.S. Cl....................................... 98/40 A, 98/2
[51] Int. Cl.............................................. F24f 13/06
[58] Field of Search........... 98/2, 40 A, 40 D, 40 N, 98/611 R; 239/451, 455

[56] References Cited
UNITED STATES PATENTS

| | | | |
|---|---|---|---|
| 1,559,057 | 10/1925 | Stewart | 98/40 A |
| 1,569,667 | 1/1926 | Neilson | 98/40 A |
| 1,754,961 | 4/1930 | Neilson | 98/40 A |

FOREIGN PATENTS OR APPLICATIONS

| | | | |
|---|---|---|---|
| 580,093 | 8/1946 | Great Britain | 98/40 |
| 576,850 | 4/1946 | Great Britain | 98/40 |
| 629,587 | 10/1961 | Canada | 98/40 |

Primary Examiner—William E. Wayner
Assistant Examiner—Paul Devinsky
Attorney, Agent, or Firm—Ernest F. Marmorek

[57] ABSTRACT

An air flow controlling nozzle having a cylindrical housing with an air input and an air output opening lying substantially diametrically opposite to each other, a pair of flow guides arranged in the housing slideably over an inner surface of the housing, each of the guides has an inner surface on a side thereof facing the inner space of the housing and an outer surface having a curvature corresponding to a curvature of the housing thereby to facilitate sliding of the guide over the inner wall of the housing, the flow guides are arranged with respect to each other and their inner surface is shaped so that the smallest distance between their inner surface remains constant at any position of the guides relative to each other, whereby the air flow through the nozzle apparatus remains constant at any relative position of the guides but the exit speed of the air can be varied by the relative positioning of the guides with respect to each other and the direction of the air flow can be also varied by the adjacent positioning of the guides at various angular positions in the housing.

13 Claims, 3 Drawing Figures

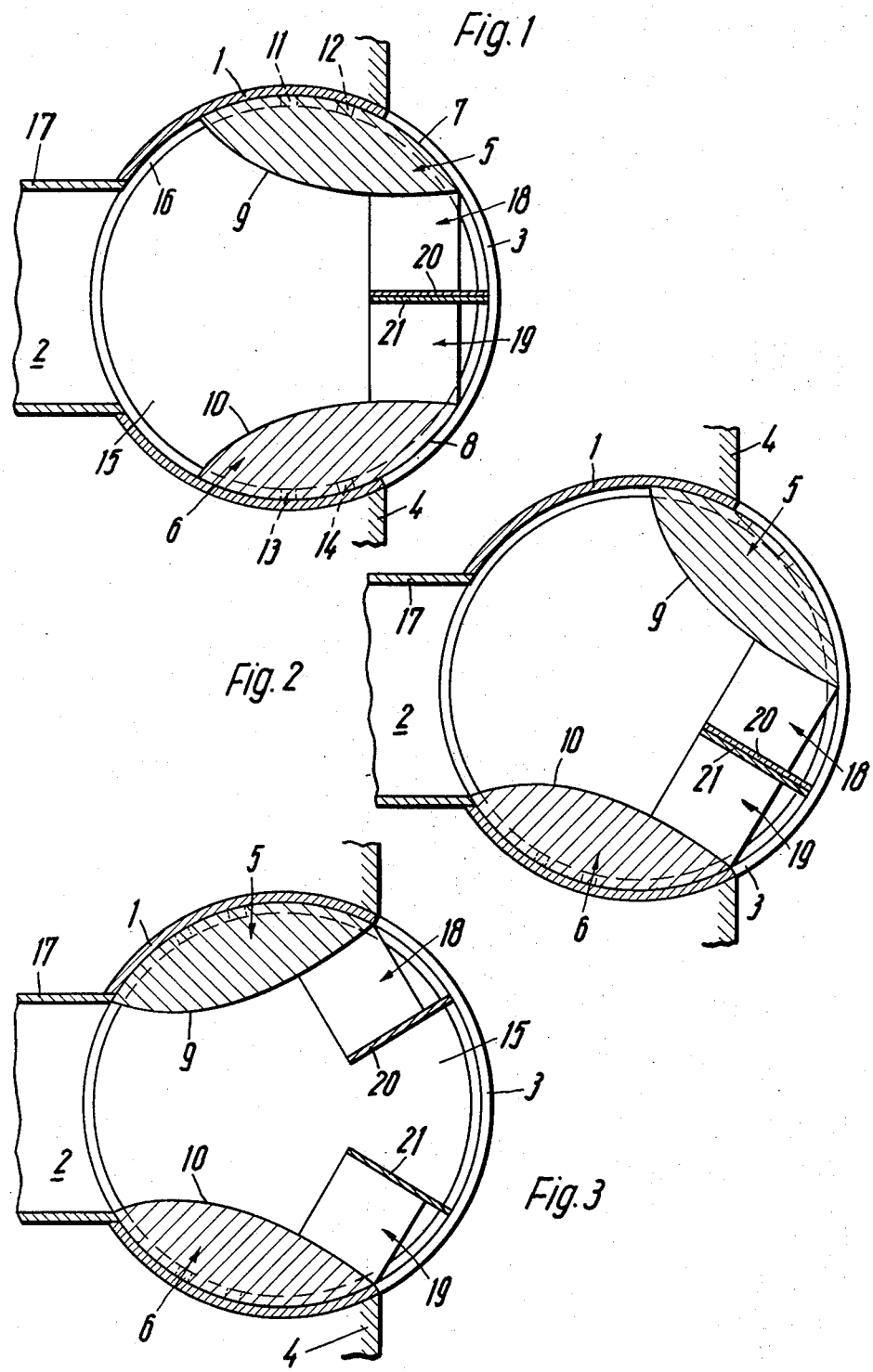

AIR FLOW CONTROLLING DEVICE FOR MOTOR VEHICLES

FIELD OF THE INVENTION

The present invention relates to an air outlet nozzle having means for changing the direction of the air exit speed and direction and which is preferably used for the providing of the inner space of motor vehicles with fresh or warm air in conjunction or without an air conditioning system.

BACKGROUND OF THE INVENTION

There is known from German Pat. No. 1,218,892 of G. Holtfreter and F. Lahme a nozzle construction of the above-mentioned type in the form of a spherical nozzle in which by tilting the sphere one will obtain a variable exiting direction for the air and which also provides for a regulation of the quantity of the air by controlling the exit velocity of the air flow as might be desirable by the driver. This type of quantitative controlling of the air flow is, however, not satisfactory since it has been found in practice that it is necessary that a certain minimum air flow or rate of flow be present in order to provide for a satisfactory air supply or air circulation within the vehicle.

SUMMARY OF THE INVENTION

It is, therefore, an object of the present invention to provide an improved air exit nozzle of the above-described type for vehicles which has a relatively simple construction and requires simple operational steps in order to attain a change in the exiting velocity of the air flow or in its direction.

According to the present invention a substantially tube-like nozzle housing is provided with at least one input opening and with at least one exit opening lying opposite to the input opening. Furthermore, the housing is provided with a pair of flow guiding members which have a lense-shaped cross-section and the outer surfaces of the guide members which lay adjacent the housing walls are provided with a curvature to adjust the guide members to the curvature of the nozzle housing, and are arranged to slide over the inner surface of the housing directly or by the provision of an intermediate sealing means therebetween. The sliding direction of the guide members is along the curvature of the housing wall. The guide members have their inner surfaces which are facing each other shaped in a convex fashion, such convex shaping running along inside across the housing. The convex shaping of the guide members is performed in such a manner that when they are moved relative to each other within a certain region over which each member individually may slide on the housing wall, the smallest distance between the guide members remains practically constant leading to a practically constant air-flow while the exit dimensions of the nozzle device therebetween vary during such relative motion of the guide members. On the other hand if the guide members are moved together along the circumferential direction of the nozzle housing, then only the exit direction of the air flow is varied thereby.

An essential aspect of the present invention resides in that while the air rate flow remains practically constant due to the above-described constantly remaining smallest distance between the two guiding members, the controlling of the velocity of the flow of the exiting air stream is possible by shifting the smallest distance existing between the two guide members, namely between two end positions, in one of which the smallest distance is adjusted to lie in the region of the air input, while in the other position the smallest distance between the guide members is adjusted to lie closer to the air exit opening.

In a preferred form of the present invention during a shifting of the location of the smallest distance between the guide members is performed by an adjustment of the flow width which is defined by the magnitude of the upper surface of the guide members exposed to the air flow.

The above-described advantages of the nozzle device according to the present invention are attained with a relatively simple construction requiring a small number of parts, low costs of making and a small space.

According to the present invention the housing of the exit nozzle device is shaped as a tue in which the pair of guide members are placed. The air exit opening can be diametrically opposite to the air entry opening, however, the entry and exit openings can be placed by forming an angle with respect to a horizontally passing diameter of the tube-like housing construction.

In a preferred embodiment of the invention the two guide members are provided with thin guide elements lying somewhat transversely with respect to the air flow and can be in the form of sheet metal members. They within the region of the exit opening abutt against each other and form a boss means for the guide members in a position where the smallest distance between the guide members is shifted to lie closer to the air exit opening. Such guide elements in the above-mentioned other position of the guide members, that is, in the case of a wider stream flow position prevent the air flow from losing contact with the guide members and, at the same time, can serve as the operating handle for the guide members. For this purpose there are provided with portions running parallel with the associated guide member. With such construction one is able to put the fingers into the air exit opening of the tube-like nozzle housing and adjust the above-mentioned guide elements of the guide members by moving them together or by moving them away from each other.

In order to provide for a defined flow width for the air stream passing over the two guide members in all possible relative positions of the guide members, it has been found advantageous if the curvature of the inner surface of the guide members tapers off in the direction from the air entry towards the air exit opening.

During a shifting or sliding of the guide members along the circumferential direction of the tube-like housing, practically a sliding of the arched inner surfaces of the guide members along an imaginary plane on each side occurs, such imaginary planes retaining between themselves the smallest possible distance at all times during the relative sliding of the guide members.

For supporting or securing the guide members in the operational position there are several possibilities. For example, they can be supported by bolt means which may project into the inner closed space of the nozzle housing through longitudinal slots. By pressing on such bolt means or on hand levers or handles associated or secured therewith, one is able to tilt the guide members with respect to each other in any desired manner, as above described, depending whether a change in the flow velocity at the exit or a change of the flow direction is desired.

In the preferred embodiments of the present invention care is taken to avoid the employment of slots about the circumference of the nozzle housing which would lead to difficulties in obtaining a good sealing of the housing. The guiding of the guide members is attained by the provision of end walls which are provided with guide recesses or grooves for guiding the guide members. Such guide grooves can be in the form of circular or arch-like recesses on the inner surface of the end walls which then cooperate with projecting means provided on the guide members. This in general can be in the form of a coulisse for the guide members. As it can be understood from the above broad description of the present invention, the exit nozzle device of the present invention provides the possibility of tilting of the air exit opening of the nozzle device in a plane. In order to attain a tilting possibility also in a plane transverse to the above-mentioned plane, there can be other means provided to this effect in addition to the end walls disclosed, such as in the form of guide surfaces which can be adjusted transversely to guide the air in that direction.

BRIEF DESCRIPTION OF THE DRAWINGS

The invention will become more readily apparent from the following description of a preferred embodiment thereof shown, by way of example, in the accompanying drawing, in which:

FIGS. 1–3 illustrate in a similar cross-sectional showing the nozzle apparatus according to the present invention for controlling the air supply to the inner space of a vehicle, each illustrating the guide members in different positions.

DESCRIPTION OF THE PREFERRED EMBODIMENT

With reference to FIGS. 1–3 of the drawing it can be seen that the nozzle housing 1 has a pipe-like construction, consequently it extends with its major dimension perpendicularly into the plane of the drawing. All figures in the drawing illustrate a similar construction, however, in a different operational position of the essential parts of the nozzle apparatus. The longitudinal extension of the nozzle apparatus has been omitted since the above explanation should be sufficient. It is, however, noted that the length of the nozzle apparatus can vary according to the specific operational requirement, or in some cases, several nozzle apparatus can be mounted side-by-side. The housing 1 is provided with an air entry opening 2 and an air exit opening 3 which in the illustrated embodiment are located diametrically opposite to each other. According to the present invention it is also possible that instead of a single entry and exit opening, there can be several of each provided. It is noted that the input opening 2 is preferably a pipe, while the exit opening 3 extends along the entire length of the nozzle apparatus. However, input 2 can extend also along the full length of the nozzle. As it can be seen on the drawing the nozzle apparatus with its housing 1 are mounted on the dash board of the vehicle 4 in any conventional manner, and particularly so that the major portion of the nozzle housing 1 is within the dash board and the affixing is preferably adjacent the exit opening 3. The nozzle housing 1 contains a pair of guide members 5 and 6 the outer surfaces 7 and 8 of which are constructed to have a curvature corresponding to the curvature of the inner surface of the pipe-shaped nozzle housing 1. The inner surfaces 9 and 10 which lie opposite to each other have a convex curvature which is made to taper-off from the direction of the air entry opening 2 towards the direction of the air exit opening 3. In their cross-section the guide members 5 and 6 have a lens-like shape which extends along their major dimension, that is, perpendicular to the sheet of the drawing, all along the length of the nozzle housing 1. On their outer surface the guide members 5 and 6 are provided with projections 11,12 and 13,14, respectively, which project into recesses or grooves 16 formed in an arch-like shape along a cover or end wall means of which only the back wall means 15 is illustrated in the figures and the inner wall portions of which have the recess or grooves 16 formed therein. The end wall means not only closes both ends of the housing 1 but also extends into it, as shown, at least to a sufficient distance to accommodate the guide recesses 16. Due to the arrangement of the guiding projections 11–14 and guiding recesses 16 and due to the appropriate curvature of the outer surfaces 7 and 8 of the guide members 5 and 6, a shifting of the nozzle apparatus from the position illustrated in FIG. 1 into the position illustrated in FIG. 3 can be had, which shifting is accomplished by the sliding of the guide members 5 and 6 away from each other. It is noted that such sliding of the guide members 5 and 6 is accomplished practically air-tight over the inner surfaces of the nozzle housing 1. The special shaping of the inner surfaces 9 and 10 of the guide members 5 and 6 assures that the smallest distance between the inner surfaces 9 and 10 of the guide members 5 and 6 remains always constant during relative movement. It can be seen that such smallest distance in both FIGS. 1 and 3 representing two extreme positions of the guide members 5 and 6 will correspond approximately to the inner diameter of the air supply pipe 17. By the provision that the smallest distance between the guide members 5 and 6 remains constant one of the objects of the invention is attained, namely, that the rate of the air flow in both positions of the guide members 5 and 6 shown in FIGS. 1 and 3, is the same. However, the width of the exiting air stream in the case of FIG. 3 is much larger than in the case of FIG. 1 due to the fact that the guide members 5 and 6 in FIG. 3 have been moved away from each other.

Each of the guide members 5 and 6 are provided also with an air guiding element 18,19 having a yoke shape, and each of which has a portion 20,21 which runs parallel with the associated guide member 5 or 6. These parallel elements 20 and 21, as can be more clearly seen in FIG. 1 and also in FIG. 2, represent an abutting or limiting means for the guide members 5 and 6 since the guide members 5 and 6 cannot be brought anymore closer to each other than illustrated in FIGS. 1 and 2. In the illustration of FIG. 3 the air guiding elements 19 and 18 are remote from each the furthest possible manner and, they are in the other extreme position of the guide members 5 and 6. Such position can be also defined by some limiting means not shown in the drawing. An examination of FIG. 3 shows that the guide elements 18 and 19 in the illustrated position prevent a braking away of the air flow from the surfaces 9 and 10 of the guide members 5 and 6, that is, the flow of air over the entire width of the exit opening 3 is assured to be uniform.

The middle regions or parallel regions 20 and 21 of the guide elements 18 and 19 are extended all the way to the outer contour of the nozzle housing 1 so that they can be used as an operating handle to control the positioning of the exit nozzle. By spreading out the end portions 20,21 of the guide members 5 and 6 and guide elements 18,19 from a position shown in FIG. 1 to that of FIG. 3, it becomes possible that without changing the rate of air flow through the nozzle device, the exiting speed of the air flow becomes changed. This is due to the changing geometry of the exit opening 3, while the smallest distance between the guide members 5 and 6 remains constant, as above described.

Referring now to FIG. 2, when both of the guide members 5 and 6 are tilted together in either upward or downward directions, the direction of the exit flow is changed without introducing any change into the exit velocity of the air. Again here the extended portions 20,21 of the guide elements 18,19 serve as the operating handle. It is also noted in connection with the illustration of FIG. 2 that the width of the exiting air stream is constant in any position whenever the elements 20,21 are abutting on each other.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An air flow controlling nozzle apparatus comprising a cylindrical housing having an air input and an air output formed therein, said air input and air output openings lying substantially opposite to each other, a pair of relatively displaceable flow guide members arranged in said housing slidably over an inner surface of said housing, each of said guide members having an inner surface on a side thereof facing the inner space of said housing and an outer surface having a curvature corresponding to a curvature of said housing thereby to facilitate sliding of said guide member over the inner wall of said housing said cylindrical housing having limit stop means and said guide members having abutment means, said guide members being arranged with respect to each other and said inner surface of each guide member being convexly shaped so that a smallest distance between said inner surfaces of said guide members remains constant at any position of said guide members relative to each other, said nozzle including means whereby the discharge velocity of said air flow can be varied by the relative positioning of said guide members with respect to each other without changing the rate of air flow of the nozzle which remains constant, and the direction of said air flow can be also varied by the adjacent positioning of said guide members at various angular positions in said nozzle housing.

2. The air controlling nozzle apparatus as claimed in claim 1, wherein said air input and air exit opening lie diametrically opposite with respect to each other.

3. The air controlling nozzle apparatus as claimed in claim 1, wherein said guide members comprise each a guide element lying in the direction of the air flow transversely with respect to said direction, said guide elements in one end position of said guide members lying adjacent with respect to each other and serving as an abutting means for said guide members and defining said end position, said smallest distance between said guide members at said end position being located near said exit opening.

4. The air controlling nozzle apparatus as claimed in claim 3, wherein said guide elements comprise portions lying parallel with respect to a portion of said guide members, said parallel portion of said guide element serving as the operating handle means for said nozzle apparatus.

5. The air controlling nozzle apparatus as claimed in claim 4, wherein the curvature of said inner surface of said guide members is tapering off towards said exit opening.

6. The air controlling nozzle apparatus as claimed in claim 1, wherein said housing comprises end cover walls having guide recesses provided therein for cooperating with projection means provided on said guide members, whereby said projection means slide in said recesses.

7. The air controlling nozzle apparatus as claimed in claim 6, wherein said recesses in said end wall means are extended in an arch-like fashion, whereby said guide members can slide within said housing over a predetermined arcuate path.

8. An air flow controlling nozzle apparatus comprising a cylindrical housing having an air input and an air output opening formed therein, said air input and air output openings lying substantially opposite to each other, a pair of flow guide members arranged in said housing slibably over an inner surface of said housing, each of said guide members having an inner surface on a side thereof facing the inner space of said housing and an outer surface having a curvature corresponding to a curvature of said housing thereby to facilitate sliding of said guide members over the inner wall of said housing, said guide members being arranged with respect to each other and said inner surface of said guide members being shaped so that a smallest distance between said inner surface of said guide members remains constant at any position of said guide members relative to each other, whereby the air flow through said nozzle apparatus remains constant at any relative position of said guide members but the exit speed of said air flow can be varied by the relative positioning of said guide members with respect to each other, and the direction of said air flow can also be varied by the adjacent positioning of said guide members at various angular positions in said nozzle housing, said guide members each comprising a guide element lying in the direction of the air flow transversely with respect to said direction, said guide elements in one end position of said guide members lying adjacent with respect to each other and serving as an abutting means for said guide members and defining said end position, said smallest distance between said guide members at said and position being located near said exit opening, said guide elements further comprising portions lying parallel with respect to a portion of said guide members, said parallel portions of said guide elements serving as the operating handle means for said nozzle apparatus.

9. The air controlling nozzle apparatus as claimed in claim 8, wherein said inner surface of each of said guide members is convexly shaped.

10. The air controlling nozzle apparatus as claimed in claim 8, wherein said air input and air exit opening lie diametrically opposite with respect to each other.

11. The air controlling nozzle apparatus as claimed in claim 8, wherein the curvature of said inner surface of said guide members is tapering off towards said exit opening.

12. The air controlling nozzle apparatus as claimed in claim 8, wherein said housing comprises end cover walls having guide recesses provided therein for cooperating with projection means provided on said guide members, whereby said projection means slide in said recesses.

13. The air controlling nozzle apparatus as claimed in claim 12, wherein said recesses in said end wall means are extended in an arch-like fashion, whereby said guide members can slide within said housing over a predetermined arcuate path.

* * * * *